(12) United States Patent
Hsu et al.

(10) Patent No.: US 11,809,228 B2
(45) Date of Patent: Nov. 7, 2023

(54) FOLDABLE DISPLAY DEVICE

(71) Applicant: FOSITEK CORPORATION, New Taipei (TW)

(72) Inventors: An-Szu Hsu, New Taipei (TW); Yan-Jiao Cheng, Shenzhen (CN)

(73) Assignee: FOSITEK CORPORATION, New Taipei (TW)

( * ) Notice: Subject to any disclaimer, the term of this patent is extended or adjusted under 35 U.S.C. 154(b) by 65 days.

(21) Appl. No.: 17/489,207

(22) Filed: Sep. 29, 2021

(65) Prior Publication Data

US 2023/0027462 A1    Jan. 26, 2023

(30) Foreign Application Priority Data

Jul. 20, 2021   (CN) .......................... 202110817925.5

(51) Int. Cl.
*G06F 1/16*   (2006.01)
(52) U.S. Cl.
CPC .......... *G06F 1/1618* (2013.01); *G06F 1/1652* (2013.01); *G06F 1/1681* (2013.01)
(58) Field of Classification Search
CPC ..... G06F 1/1618; G06F 1/1652; G06F 1/1681
See application file for complete search history.

(56) References Cited

U.S. PATENT DOCUMENTS

| | | | | |
|---|---|---|---|---|
| 9,119,316 B2* | 8/2015 | Lee | ...................... | H04M 1/0216 |
| 9,348,362 B2* | 5/2016 | Ko | ...................... | G06F 1/1601 |
| 10,394,282 B2* | 8/2019 | Lee | ...................... | G06F 1/1677 |
| 10,520,992 B1* | 12/2019 | Chang | ...................... | H05K 5/0226 |
| 11,048,305 B1* | 6/2021 | Ye | ...................... | H04M 1/0268 |
| 11,237,596 B2* | 2/2022 | Kim | ...................... | G09F 9/301 |
| 11,372,453 B2* | 6/2022 | Yu | ...................... | G06F 9/30 |
| 2014/0029171 A1* | 1/2014 | Lee | ...................... | H04M 1/0216 |
| | | | | 361/679.01 |
| 2014/0226275 A1* | 8/2014 | Ko | ...................... | G06F 1/1652 |
| | | | | 361/679.27 |
| 2016/0062408 A1* | 3/2016 | Lee | ...................... | G06F 1/1641 |
| | | | | 345/173 |
| 2019/0032380 A1* | 1/2019 | Wu | ...................... | G06F 1/1681 |
| 2020/0029449 A1* | 1/2020 | Makinen | ...................... | G06F 1/1652 |
| 2020/0387195 A1* | 12/2020 | Kim | ...................... | G06F 1/1652 |
| 2021/0200277 A1* | 7/2021 | Park | ...................... | E05D 3/122 |
| 2021/0223826 A1* | 7/2021 | Ye | ...................... | H04M 1/0206 |
| 2021/0303032 A1* | 9/2021 | Hong | ...................... | G06F 1/1641 |
| 2021/0303033 A1* | 9/2021 | Hong | ...................... | G09F 9/301 |
| 2021/0307186 A1* | 9/2021 | Hong | ...................... | G09F 9/301 |
| 2022/0019268 A1* | 1/2022 | Yu | ...................... | H04M 1/0216 |
| 2022/0221911 A9* | 7/2022 | Yu | ...................... | G06F 1/1641 |
| 2023/0027462 A1* | 1/2023 | Hsu | ...................... | G06F 1/1618 |

\* cited by examiner

*Primary Examiner* — Anthony M Haughton
*Assistant Examiner* — Theron S Milliser
(74) *Attorney, Agent, or Firm* — Burris Law, PLLC

(57) ABSTRACT

A foldable display device includes a hinge, a housing shell unit and a display unit. The housing shell unit includes two housing shells connected with left and right sides of the hinge, two support plates respectively disposed on the housing shells, and a plurality of pairs of display rails defined between the housing shells and the support plates. Each housing shell has a base shell wall connected with the hinge. Each display rail has a rail groove. The display unit is securely disposed to the hinge, and is movably engaged in the rail grooves. The hinge is rotatable between an unfolded position and an outfolding position. During rotation of the hinge, the display unit is moved along the rail grooves.

9 Claims, 22 Drawing Sheets

FOLDABLE DISPLAY DEVICE

CROSS-REFERENCE TO RELATED APPLICATION

This application claims priority of Chinese Patent Application No. 202110817925.5, filed on Jul. 20, 2021.

FIELD

The disclosure relates to a foldable display device, and more particularly to a foldable display device with a hinge connecting with two housing shells.

BACKGROUND

Recently, smart phones have become most common electronic devices. Due to the improvement in the performance of processors, batteries, etc. of smart phones, replacement of mobile phones is not as frequent as when such products first came out. In order to gain interest from consumers and meet the needs of large display dimension and convenient portability, foldable smart phones have also developed. Foldable smart phones have an infolding display structure and an outfolding display structure. In the infolding display structure, two folded display parts of a flexible display are close to and face each other, and are folded inwardly of two housing shells. In the outfolding display structure, the two folded display parts are disposed back to back and away from each other to be exposed outwardly of the two housing shells. The dimension of an outfolding smart phone in the outfolding state is generally the same as that of a common smart phone for facilitating direct use by a consumer in this state. It is also used when unfolded to provide a larger visual display for watching movies, playing mobile games, etc. Thus, the outfolding smart phones are more favorable to current consumers. However, during the folding process of certain outfolding smart phones, the flexible display is subject to a pulling force due to a difference between the inner and outer depths of the display and the inwardly folded housing shells. Moreover, the flexible display of certain outfolding smart phones is not sufficiently supported by a hinge at a center of the display in a folded state, which adversely affects the display upon use.

SUMMARY

Therefore, an object of the disclosure is to provide a foldable display device that can alleviate at least one of the drawbacks of the prior art.

According to the disclosure, the foldable display device includes a hinge, a housing shell unit and a display unit. The housing shell unit includes two housing shells which are respectively connected with left and right sides of the hinge in a left-right direction, two support plates which are respectively disposed on the housing shells, and a plurality of pairs of display rails which are defined between the housing shells and the support plates in an up-down direction that is transverse to the left-right direction. Each of the housing shells has a base shell wall which is connected with the hinge. Each of the display rails has a rail groove. The display unit is securely disposed to the hinge at a center portion extending in a front-rear direction that is transverse to both the left-right direction and the up-down direction, and has a peripheral portion which is movably engaged in the rail grooves of the display rails. The hinge is rotatable between an unfolded position, where the housing shells are in an unfolded state, and an outfolding position, where the base shell walls of the housing shells are close to and face each other. During rotation of the hinge between the unfolded position and the outfolding position, the display unit is moved along the rail grooves.

With the display unit which is slidably engaged with the rail grooves of the display rails, when the hinge is rotated between the unfolded position and the outfolding position, the display unit is movable relative to the housing shells, which prevents the display unit from a pulling or compressing force due to a difference between the inner and outer depths of the folded housing shells that might damage the display unit.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
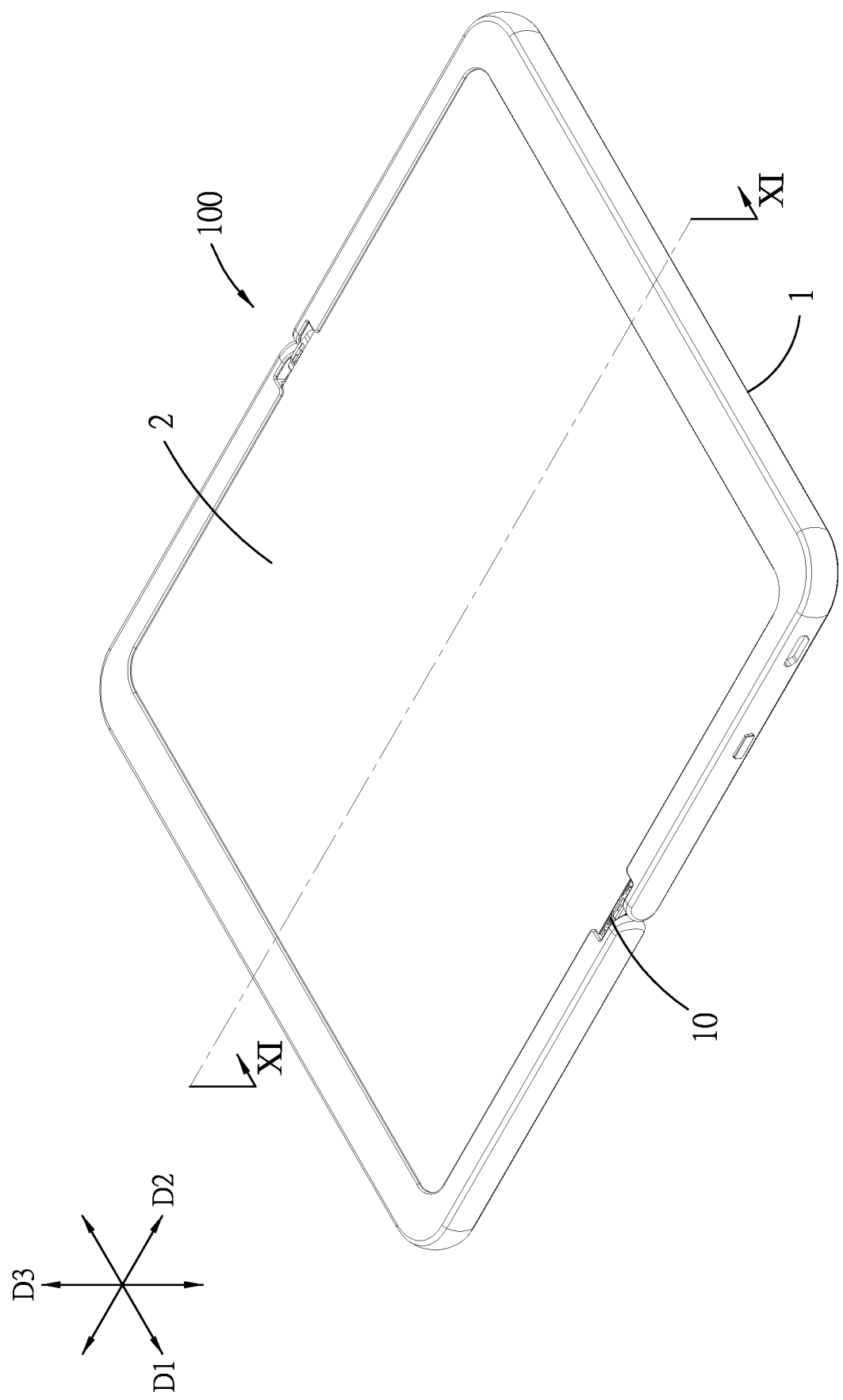
FIG. 1 is a perspective view illustrating an embodiment of a foldable display device according to the disclosure in an unfolded state.
Figure 2:
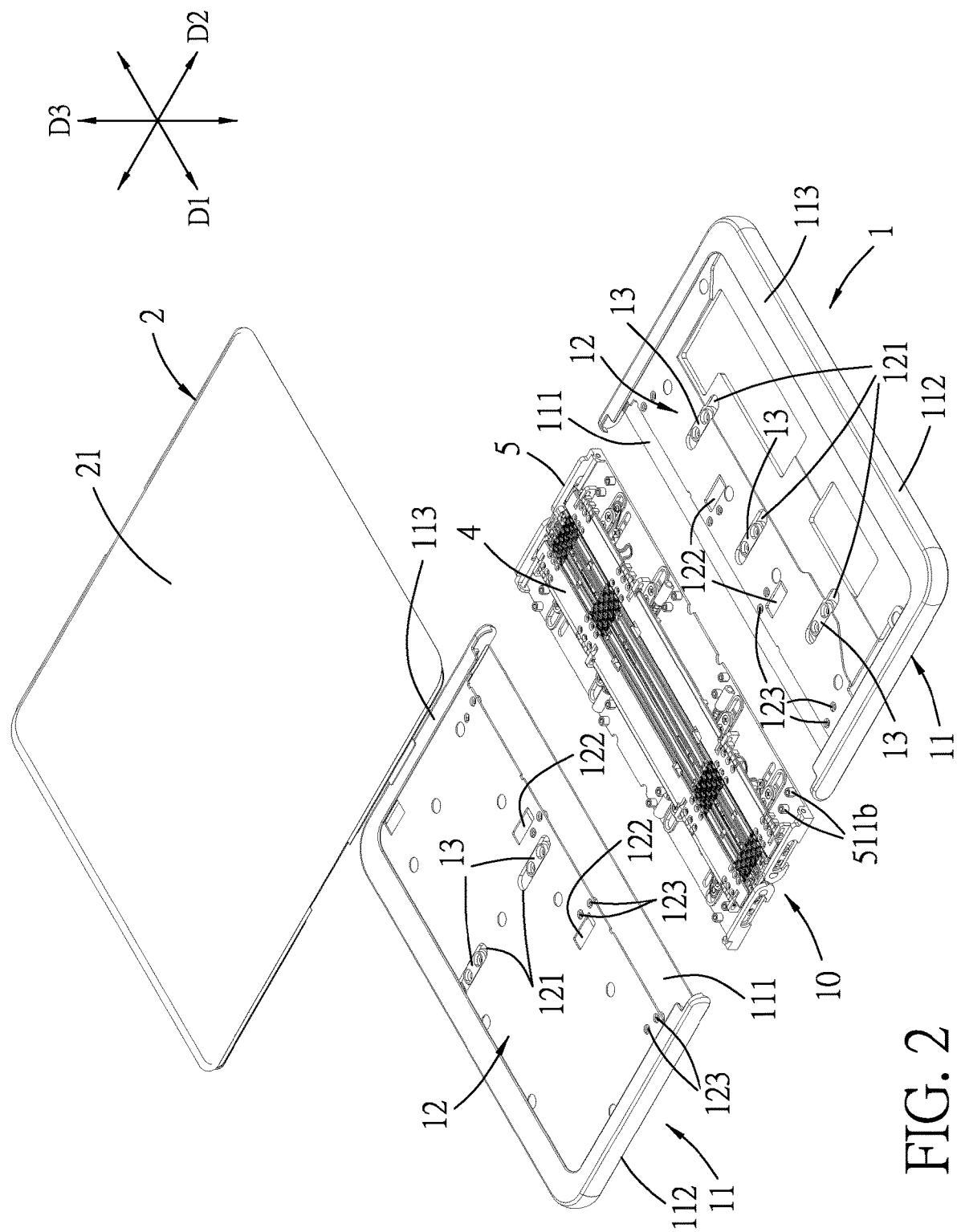
FIG. 2 is an exploded perspective view of the embodiment.
Figure 3:
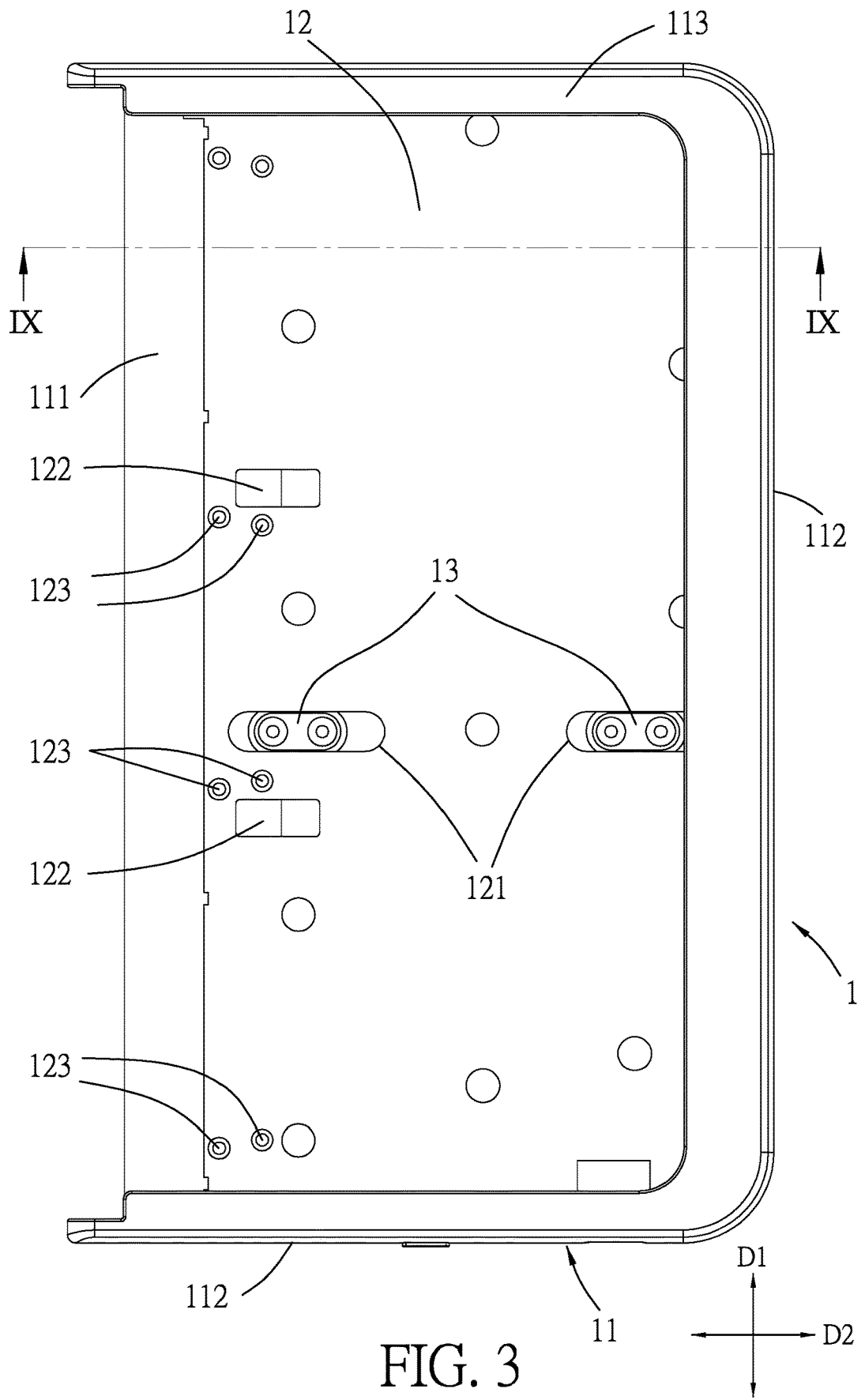
FIG. 3 is a top view of a portion of a housing shell unit of the embodiment.
Figure 4:
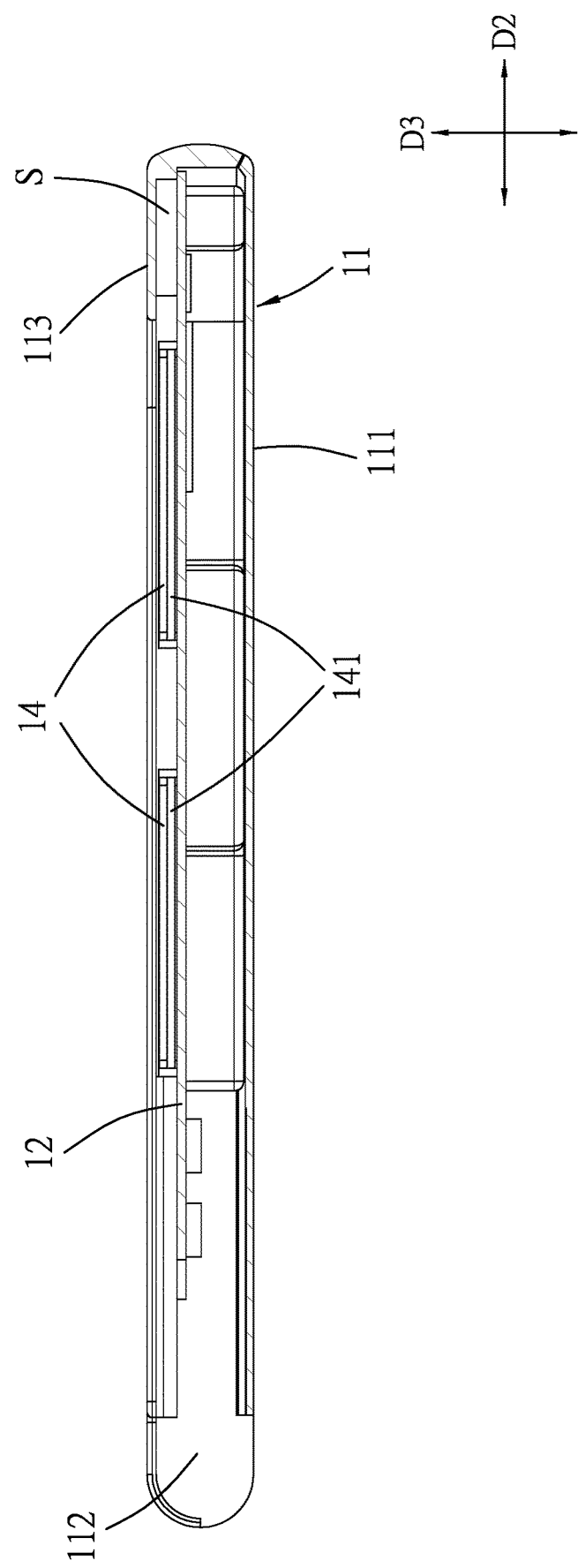
FIG. 4 is a sectional view taken from line IX-IX of FIG. 3.
Figure 5:
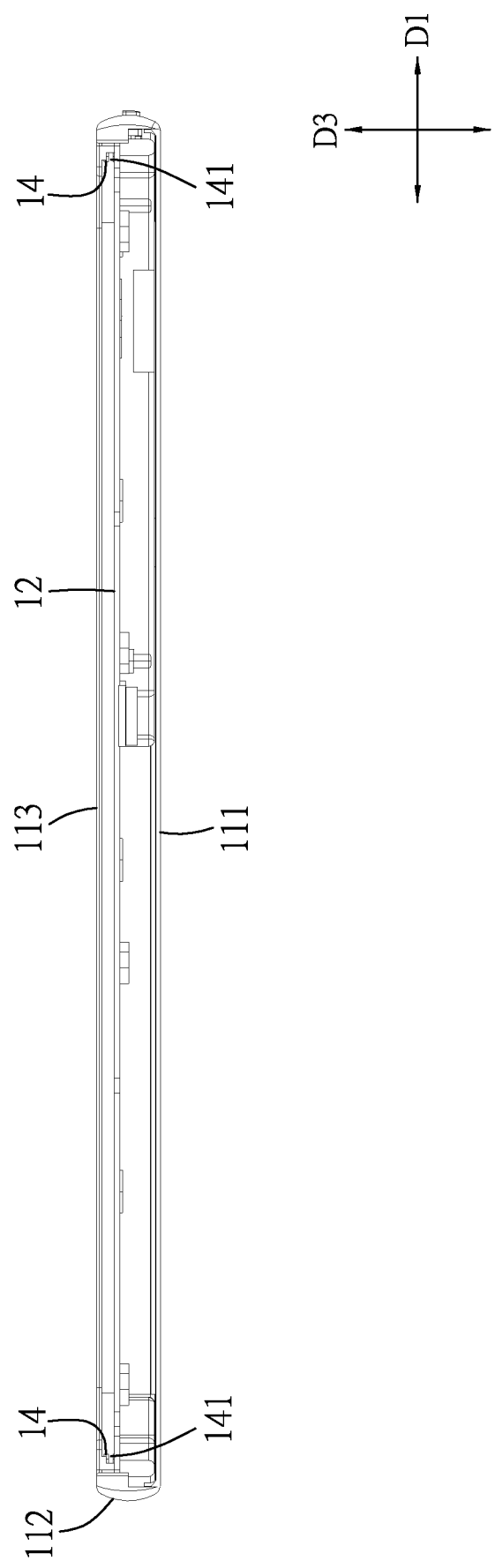
FIG. 5 is a side view of the housing shell unit of the embodiment.

Referring to FIGS. 1 and 2, an embodiment of a foldable display device 100 according to the disclosure includes a hinge 10, a housing shell unit 1 and a display unit 2.

With reference to FIGS. 3 to 6, the housing shell unit 1 includes two housing shells 11 which are respectively connected with left and right sides of the hinge 10 in a left-right direction (D2), two support plates 12 which are respectively disposed on the housing shells 11, and a plurality of pairs of display rails 14 which are defined between the housing shells 11 and the support plates 12 in an up-down direction (D3) that is transverse to the left-right direction (D2). Each housing shell 11 has a base shell wall 111 which is connected with the hinge 10, a surrounding wall 112 which extends upwardly from a periphery of the base shell wall 111, and an upper flange wall 113 which extends inwardly from an upper end of the surrounding wall 112. Each support plate 12 is spaced apart from both the base shell wall 111 and the upper flange wall 113 in the up-down direction (D3), and is formed with a plurality of display sliding slots 121, each of which extends in the left-right direction (D2), two moving slots 122, each of which extends in the left-right direction (D2) and is spaced apart from the display sliding slots 121, and a plurality of circular through holes 123. Each support plate 12 cooperates with the surrounding wall 112 and the upper flange wall 113 to define a moving space (S) for movably receiving the display unit 2. Each display rail 14 is disposed in the moving space (S), and between the respective support plate 12 and a portion of the upper flange wall 113 extending in the left-right direction (D2) and at one of front and rear sides of the display unit 2. Each display rail 14 has a rail groove 141. The housing shell unit 1 further includes a plurality of display sliding pieces 13 which are respectively and slidably received in the display sliding slots 121 and each of which is secured to the display unit 2.

Figure 6:
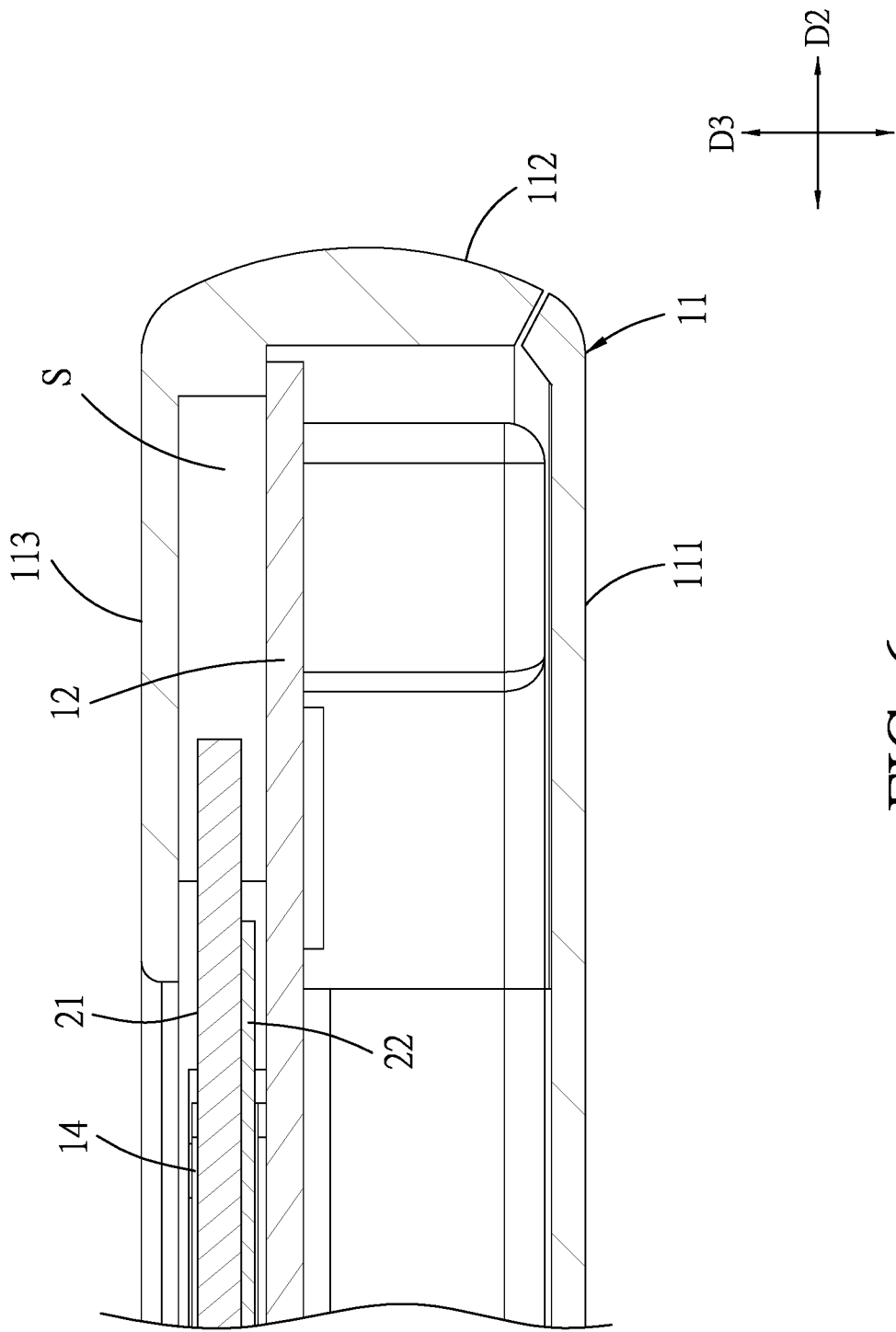
FIG. 6 is a fragmentary sectional view taken from line XI-XI of FIG. 1.
Figure 7:
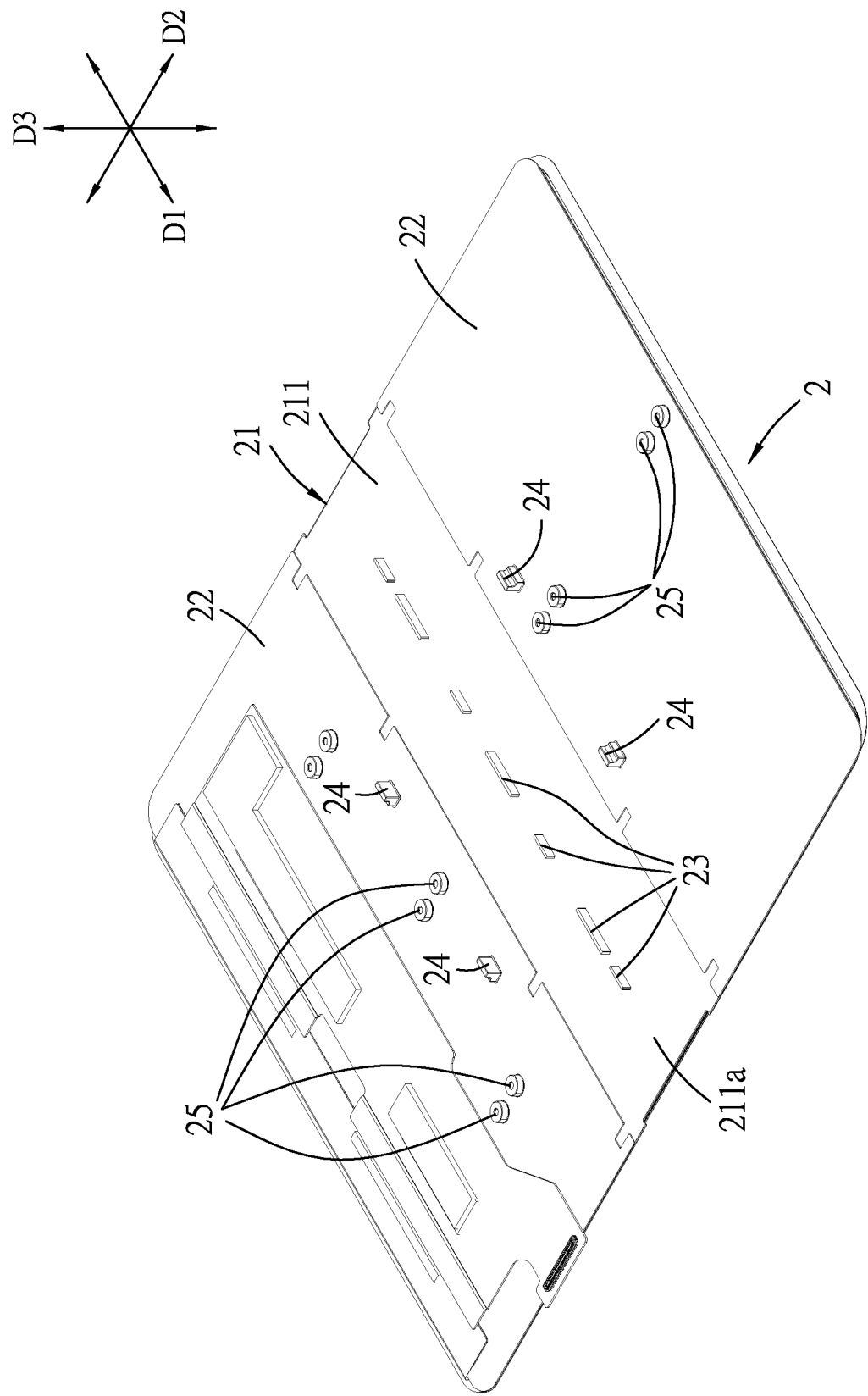
FIG. 7 is a perspective view of a display unit of the embodiment.

With reference to FIGS. 2, 6 and 7, the display unit 2 is securely disposed to the hinge 10 at a center portion (211a) extending in a front-rear direction (D1) that is transverse to both the left-right direction (D2) and the up-down direction (D3), and has a peripheral portion which is movably engaged in the rail grooves 141 of the display rails 14. The display unit 2 includes a flexible display 21 which has an attachment surface 211 facing the hinge 10. The attachment surface 211 has the central portion (211a) securely connected to the hinge 10. The display unit 2 further includes two sliding plates 22 which are movably engaged with the rail grooves 141, a plurality of positioning ribs 23 which are arranged in the front-rear direction (D1) and on the center portion (211a) of the attachment surface 211 of the flexible display 21, two pairs of moved protrusions 24 which are respectively and securely disposed on the sliding plates 22, and a plurality of connecting studs 25 which are secured on the sliding plates 22 and extend toward the support plates 12. The two sliding plates 22 are securely attached to the attachment surface 211 of the flexible display 21 and are spaced apart from each other by the central portion (211a). Each sliding plate 22 is securely connected with the display sliding pieces 13 by virtue of the connecting studs 25. It is noted that the number of the display sliding pieces 13, the display sliding slots 121, the positioning ribs 23, the moved protrusions 24, the moving slots 122 and the connecting studs 25 may be varied as required.

Figure 8A:
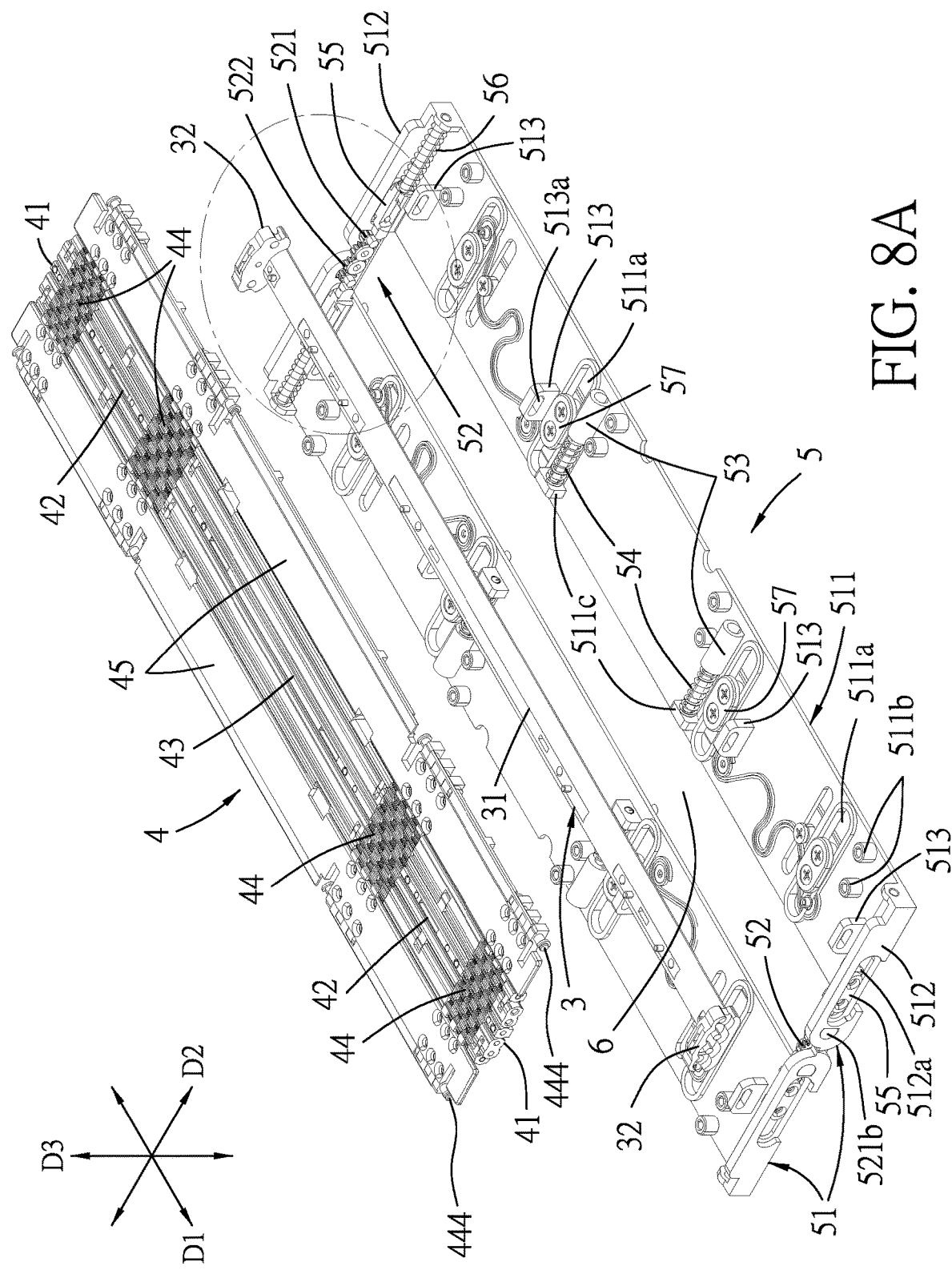
FIG. 8A is an exploded perspective view of a hinge of the embodiment.
Figure 8B:
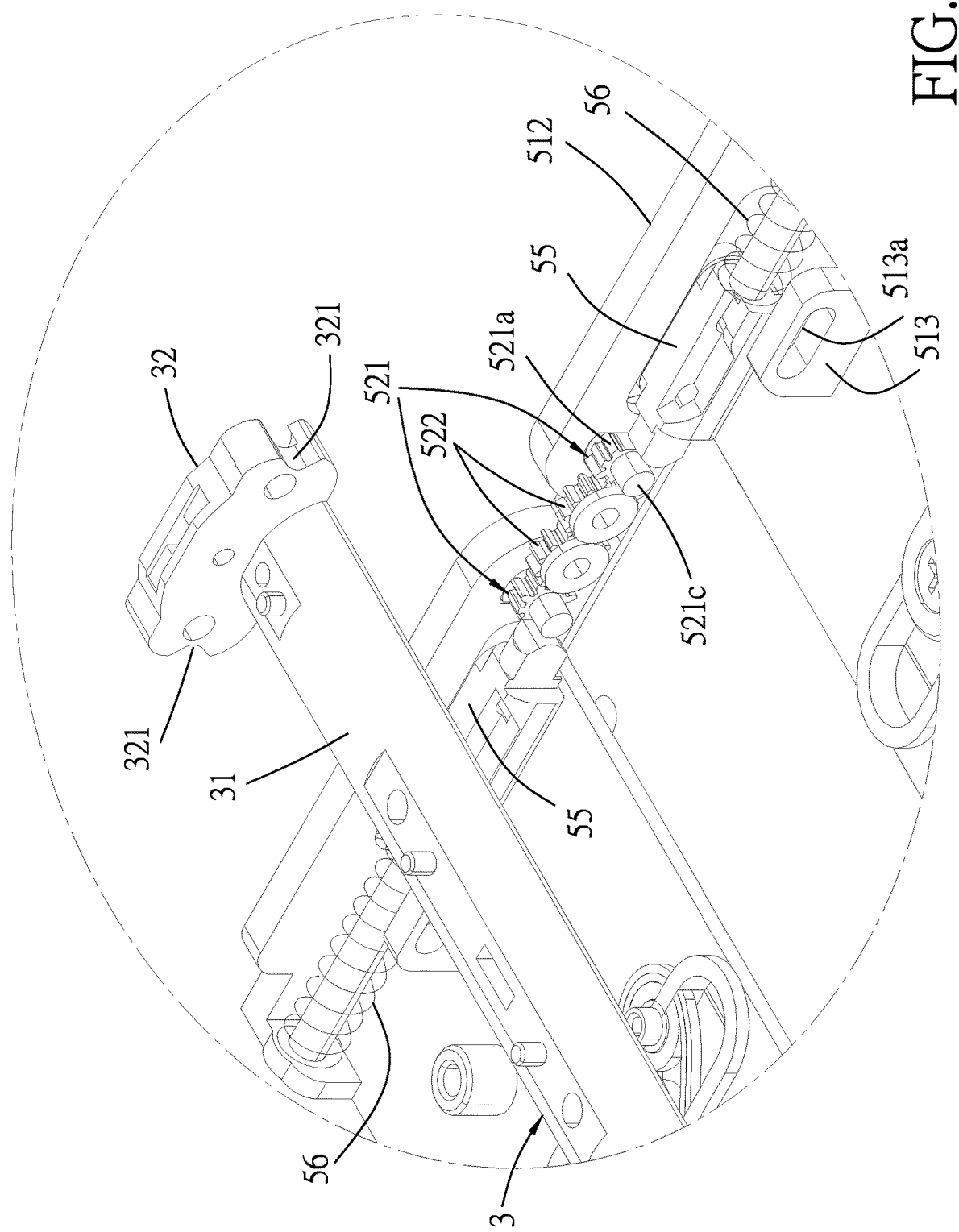
FIG. 8B is an enlarged view of an encircled portion in FIG. 8A.
Figure 9A:
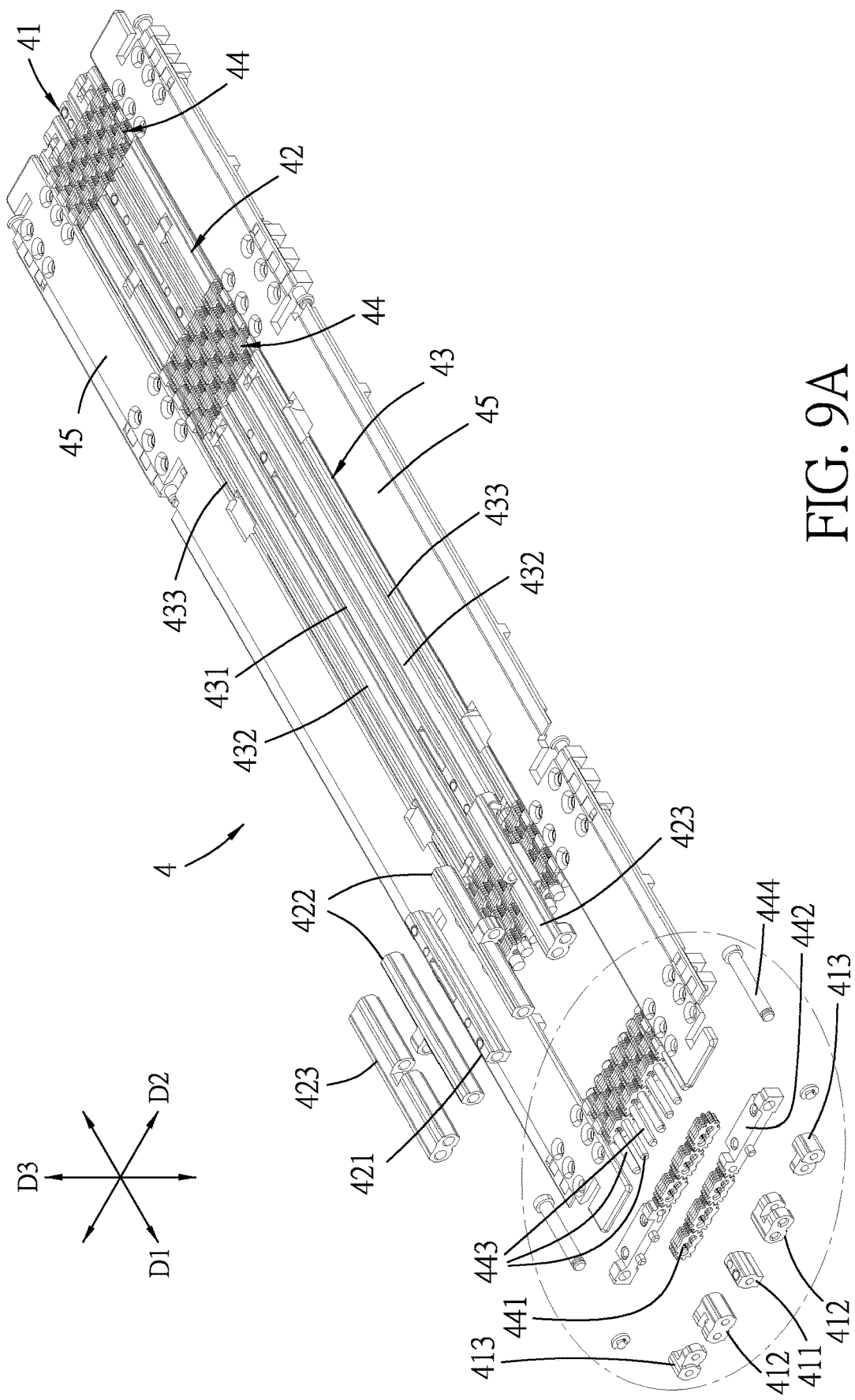
FIG. 9A is an exploded perspective view of a torsion module of the hinge of the embodiment.
Figure 9B:
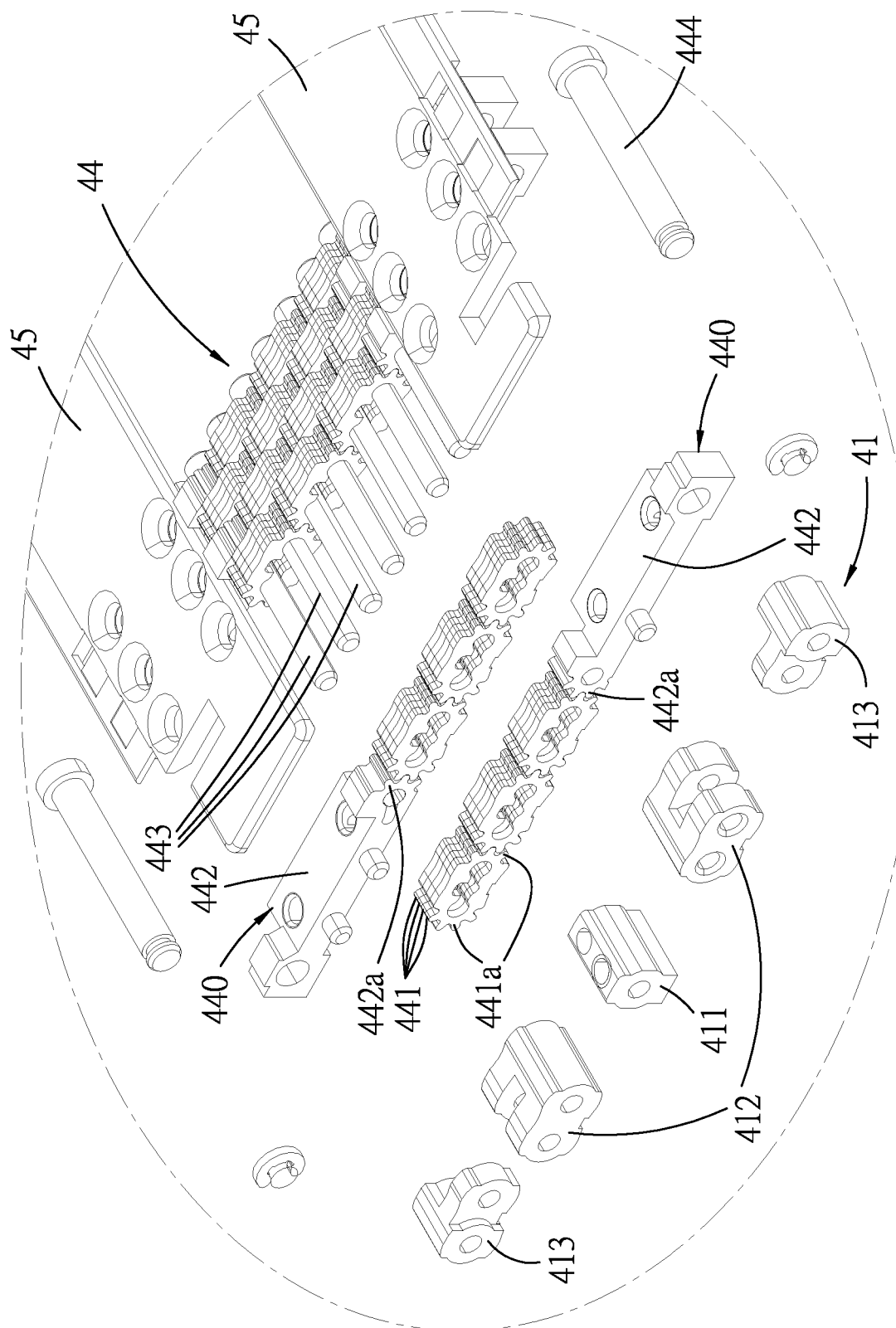
FIG. 9B is an enlarged view of an encircled portion in FIG. 9A.
Figure 10:
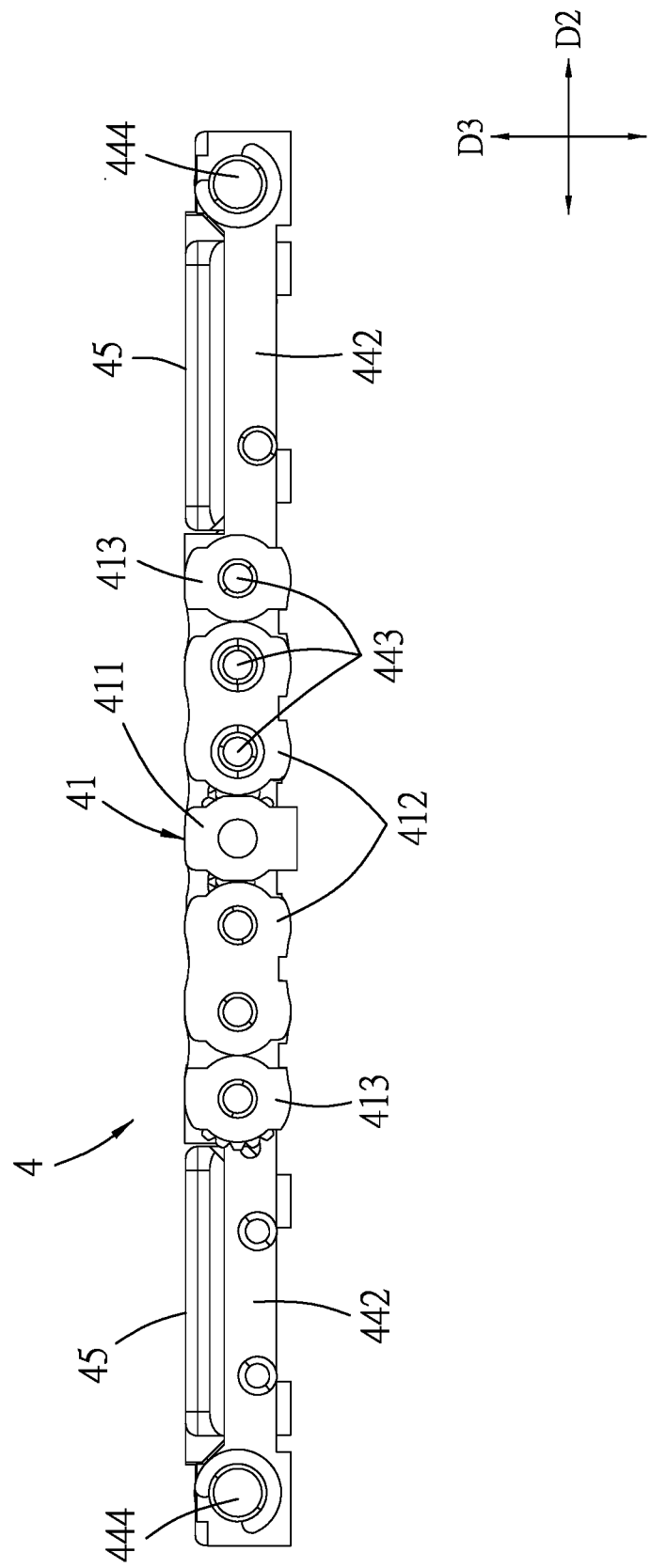
FIG. 10 is a front view of the torsion module of the hinge of the embodiment, illustrating that the hinge is in an unfolded position.

With reference to FIGS. 2, 8A and 8B, the hinge 10 includes a base seat 3 elongated in the front-rear direction (D1), a bracket module 5 disposed below the base seat 3, a torsion module 4 disposed above the base seat 3 and securely connected to the central portion (211a) of the flexible display 21, and an enclosure member 6 disposed below the bracket module 5. The base seat 3 includes an elongated strip 31 and two receiving blocks 32 respectively connected with front and rear ends of the elongated strip 31. Each receiving block 32 has two recesses 321 respectively formed at left and right ends thereof.

With reference to FIGS. 8A, 8B, 9A, 9B and 10, the torsion module 4 includes two outer supporting units 41 respectively disposed on front and rear ends of the base seat 3 and extending in the front-rear direction (D1), two middle supporting units 42 each disposed on the base seat 3 and extending in the front-rear direction (D1), an inner supporting unit 43 disposed on the base seat 3 and extending in the front-rear direction (D1), two pairs of torsion plate units 44 (each pair is disposed between the inner supporting unit 43 and one of the outer supporting units 41), and two arm plates 45 extending in the front-rear direction (D1) for supporting the display unit 2 thereon. Each outer supporting unit 41 has a central outer supporting tube 411 which is securely connected to the base seat 3, two first outer supporting tubes 412 which are disposed outboard of the central outer supporting tube 411, and two second outer supporting tubes 413 which are disposed outboard of and respectively and pivotally connected with the first outer supporting tubes 412. Each middle supporting unit 42 is interposed between two torsion plate units 44 of each pair, and has a central middle supporting tube 421 which is securely connected to the base seat 3, two first middle supporting tubes 422 which are disposed outboard of the central middle supporting tube 421, and two second middle supporting tubes 423 which are disposed outboard of and respectively and pivotally connected with the first middle supporting tubes 422. The inner supporting unit 43 has a central inner supporting tube 431 which is securely connected to the base seat 3, two first inner supporting tubes 432 which are disposed outboard of the central inner supporting tube 431, and two second inner supporting tubes 433 which are disposed outboard of and respectively and pivotally connected with the first inner supporting tubes 432. The supporting tubes of the outer supporting unit 41, the middle supporting unit 42 and the inner supporting unit are aligned with each other in the front-rear direction (D1), and are different in lengths. The positioning ribs 23 of the display unit 2 are inserted into the central outer supporting tubes 411, the central middle supporting tubes 421 and the central inner supporting tube 431 to secure the flexible display 21 to the torsion module 4.

Each torsion plate unit 44 has a plurality of torsion plate assemblies 440 which are alternately arranged in the front-rear direction (D1), and a plurality of connecting shafts 443, each of which extends through the torsion plate assemblies 440, the corresponding middle supporting unit 42, and one of the inner supporting unit 43 and the corresponding outer supporting unit 41. Specifically, the connecting shafts 443 of the two torsion plate units 44 adjacent to the outer supporting units 41 extend through the corresponding torsion plate assemblies 440, the corresponding outer supporting unit 41 and the corresponding middle supporting unit 42. The connecting shafts 443 of the two torsion plate units 44 adjacent to the inner supporting units 43 extend through the corresponding torsion plate assemblies 440, the inner supporting unit 43 and the corresponding middle supporting unit 42. Thus, the outer supporting units 41, the middle supporting units 42, the inner supporting unit 43 and the torsion plate units 44 are rotatable synchronously. Each torsion plate assembly 440 has three sets of torsion plates 441 which are arranged in the left-right direction (D2), and a lateral connecting piece 442 which is connected with the torsion plates 441 of one set. The torsion plates 441 of each set are aligned with each other in the front-rear direction (D1), such as four torsion plates 441 of each set, and two of the connecting shafts 443 extend through the torsion plates 441 of each set. Each torsion plate 441 has toothed portions (441a) formed at two sides thereof which mesh with those of an adjacent one of the torsion plates 441 so as to permit relative rotation of the torsion plates 441. The lateral connecting piece 442 has a gear portion (442a) which meshes with the toothed portion (441a) of the adjacent torsion plate 441. Each arm plate 45 is securely connected with the corresponding lateral connecting pieces 442 at the same side.

With reference to FIGS. 2, 8A and 8B, the bracket module 5 includes two brackets 51 which extend in the front-rear direction (D1), which are respectively and securely connected to the support plates 12, and each of which is rotatable relative to the base seat 3, and two synchronizing units 52 which are respectively disposed on the front and rear ends of the base seat 3. Each bracket 51 has a bracket plate 511 elongated in the front-rear direction (D1), two end plates 512 respectively and transversely disposed from front and rear ends of the bracket plate 511 and extending in the left-right direction (D2), and four connecting blocks 513 disposed on the bracket plate 511 and each having an extending slot (513a). The bracket plate 511 is formed with four sliding slots (511a) extending in the left-right direction (D2), and eight posts (511b) and two abutment walls (511c) formed thereon. The bracket plate 511 is securely connected to the support plate 12 by the posts (511b) engaging with the through holes 123. Each end plate 512 is in the form of an L-shaped plate which is formed with a guiding slot (512a) that extends in the left-right direction (D2). Each torsion plate unit 44 further has two coupling shafts 444, each of which is securely connected with the corresponding lateral connecting pieces 442 and extends through the extending slot (513a) of the respective connecting block 513 such that rotation of the brackets 51 is transmitted to rotate the arm plates 45, the lateral connecting pieces 442 and the torsion plates 441. The coupling shafts 444 movably extend through the extending slots (513a).

The synchronizing units 52 are respectively connected with the end plates 512 of the brackets 51 at the same side to make a synchronous rotation of the brackets 51 relative to the base seat 3. Specifically, each synchronizing unit 52 has two rotating members 521 which are rotatably disposed in the respective receiving block 32 of the base seat 3 and which are respectively connected with the end plates 512 of the brackets 51, and two synchronous gears 522 which are rotatably disposed in the respective receiving block 32 and mesh with each other and which are interposed between the rotating members 521. Each rotating member 521 has a rotating gear portion (521a) which meshes with the adjacent synchronous gear 522, a transmitting shaft portion (521b) which is securely (i.e., non-rotatably) connected with the corresponding end plate 512, and a pivot shaft portion (521c) which is extended in the corresponding receiving block 32. Thus, a torque generated as a result of a rotation of one bracket 51 relative to the base seat 3 is transmitted through the rotating members 521 and the synchronous gears 522 to the other bracket 51 so as to make the synchronous rotation of the brackets 51.

The bracket module 5 further includes two pairs of thrust members 53 which are respectively and movably disposed in the moving slots 122 of the support plates 12 and respectively abut against the moved protrusions 24 of the display unit 2, two pairs of thrust biasing members 54, each of which is disposed between the respective abutment wall (511c) and the corresponding thrust member 53 to bias the corresponding thrust member 53 to the corresponding moved protrusion 24, four positioning members 55, each of which is slidably engaged in the guiding slot (512a) of the end plate 512 and abuts against the corresponding receiving block 32, four positioning biasing members 56, each of which is disposed between the respective positioning member 55 and the corresponding end plate 512 to bias the positioning member 55 to the corresponding receiving block 32, and four sliding blocks 57 which are respectively and slidably received in the sliding slots (511a). The enclosure member 6 is disposed to shield the bracket module 5 and the base seat 3, and is secured to the sliding blocks 57 to be slidable relative to the brackets 51.

Figure 11:
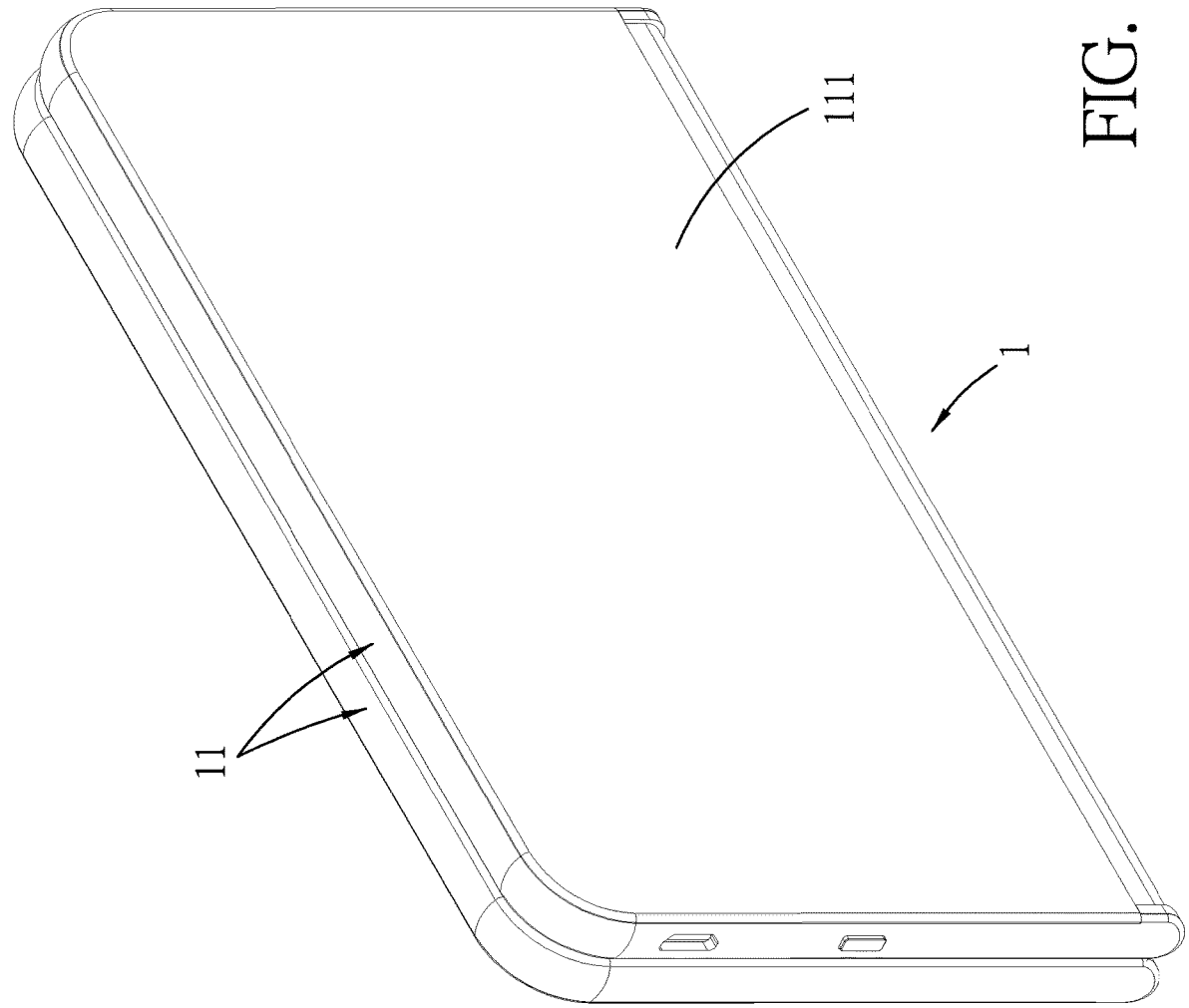
FIG. 11 is a perspective view of the embodiment in an infolding state.
Figure 11:
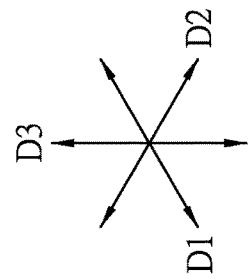
Figure 12:
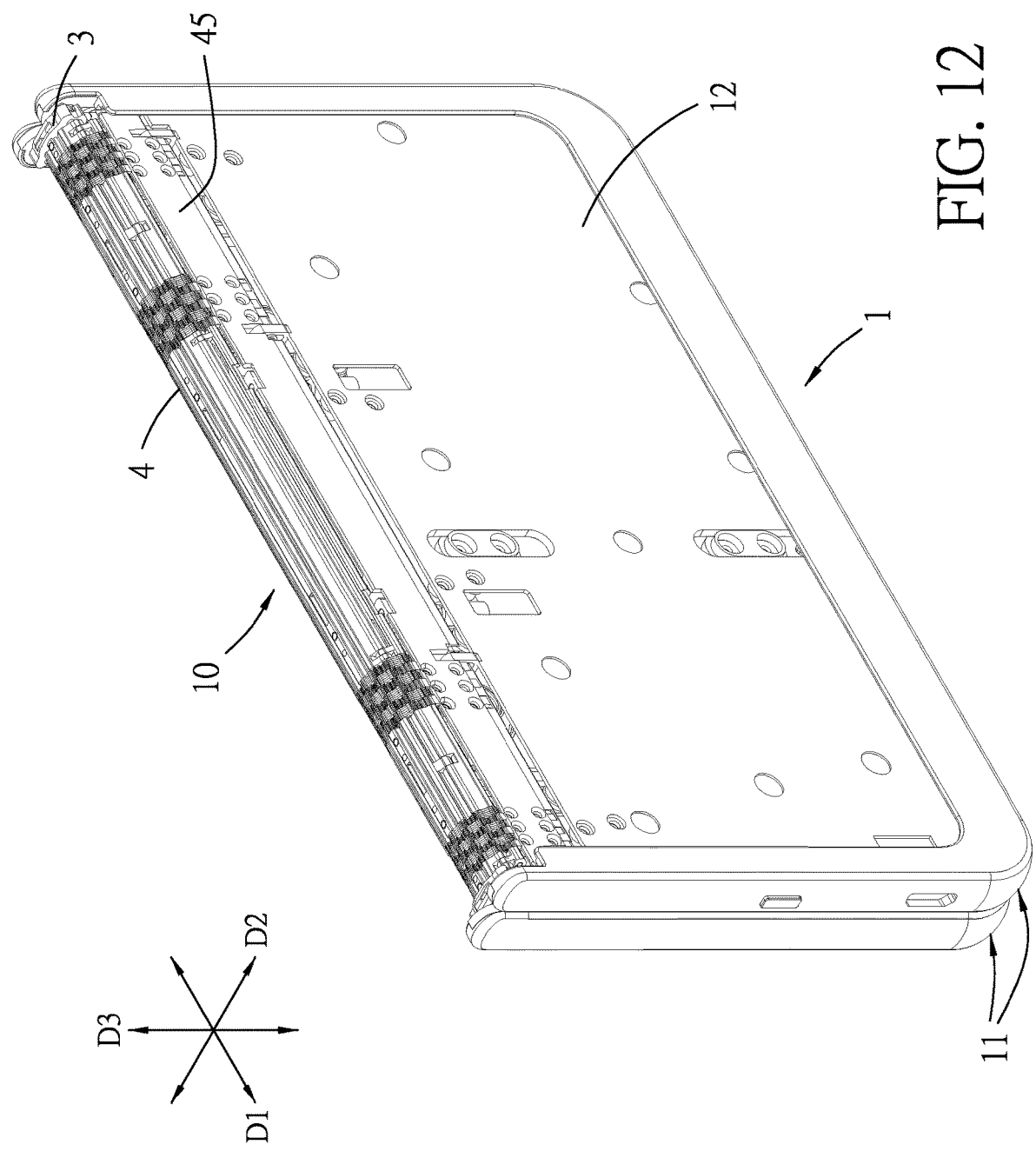
FIG. 12 is a perspective view of the embodiment in an outfolding state, in which the display unit is removed therefrom.

With reference to FIGS. 1, 11 and 12, the hinge 10 is rotatable among an infolding position, where the support plates 12 are close to and face each other, an unfolded position, where the housing shells 11 are in an unfolded state, and an outfolding position, where the base shell walls 111 of the housing shells 11 are close to and face each other. That is, the hinge 10 brings the two housing shells 11 into rotation from 0 degree to 180 degrees, even to 360 degrees. During rotation of the hinge 10 between the infolding position and the unfolded position, and during rotation of the hinge 10 between the unfolded position and the outfolding position, the display unit 2 is moved along the rail grooves 141.

Figure 13:
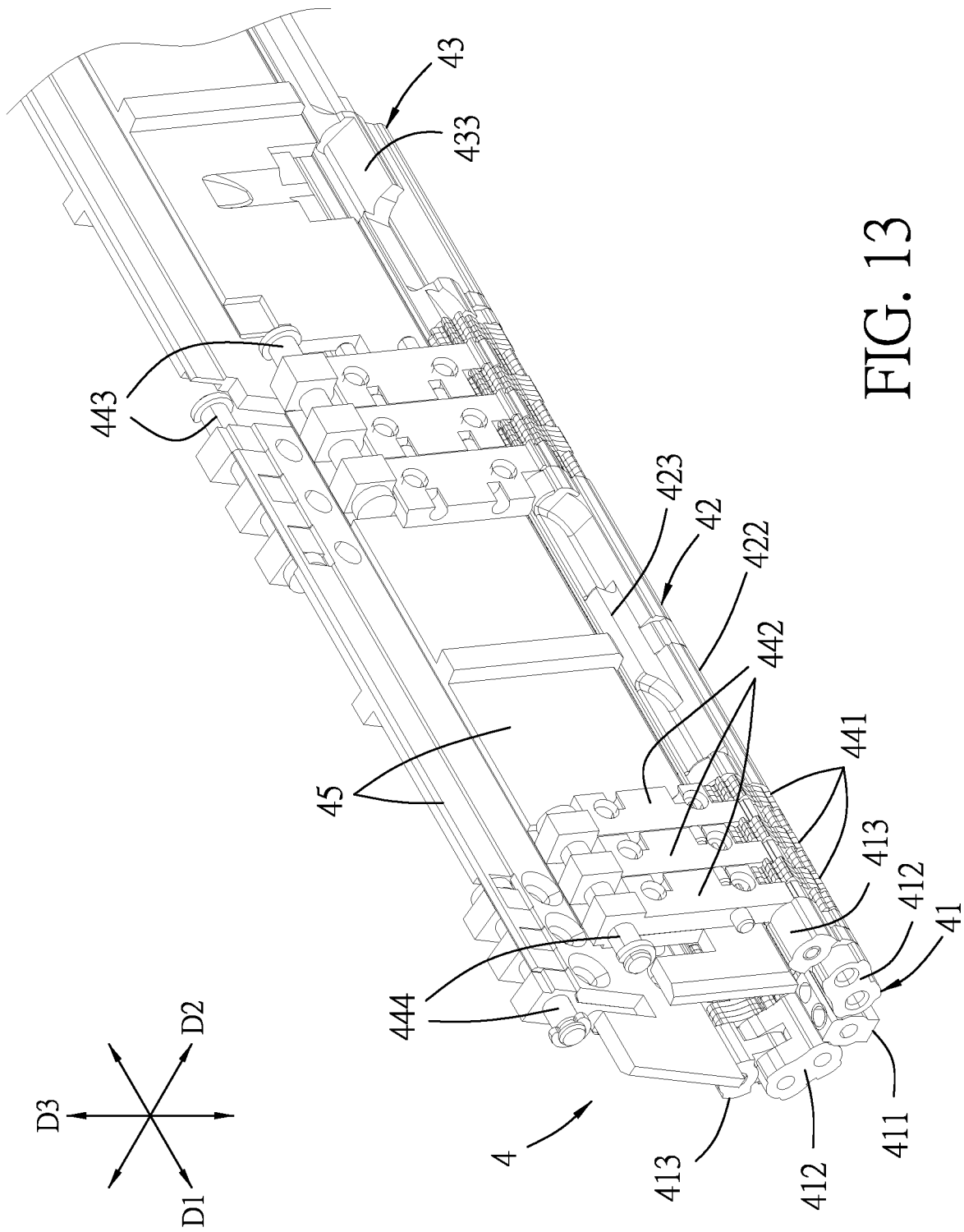
FIG. 13 is a fragmentary perspective view of the torsion module, illustrating that the hinge is in an infolding position.
Figure 14:
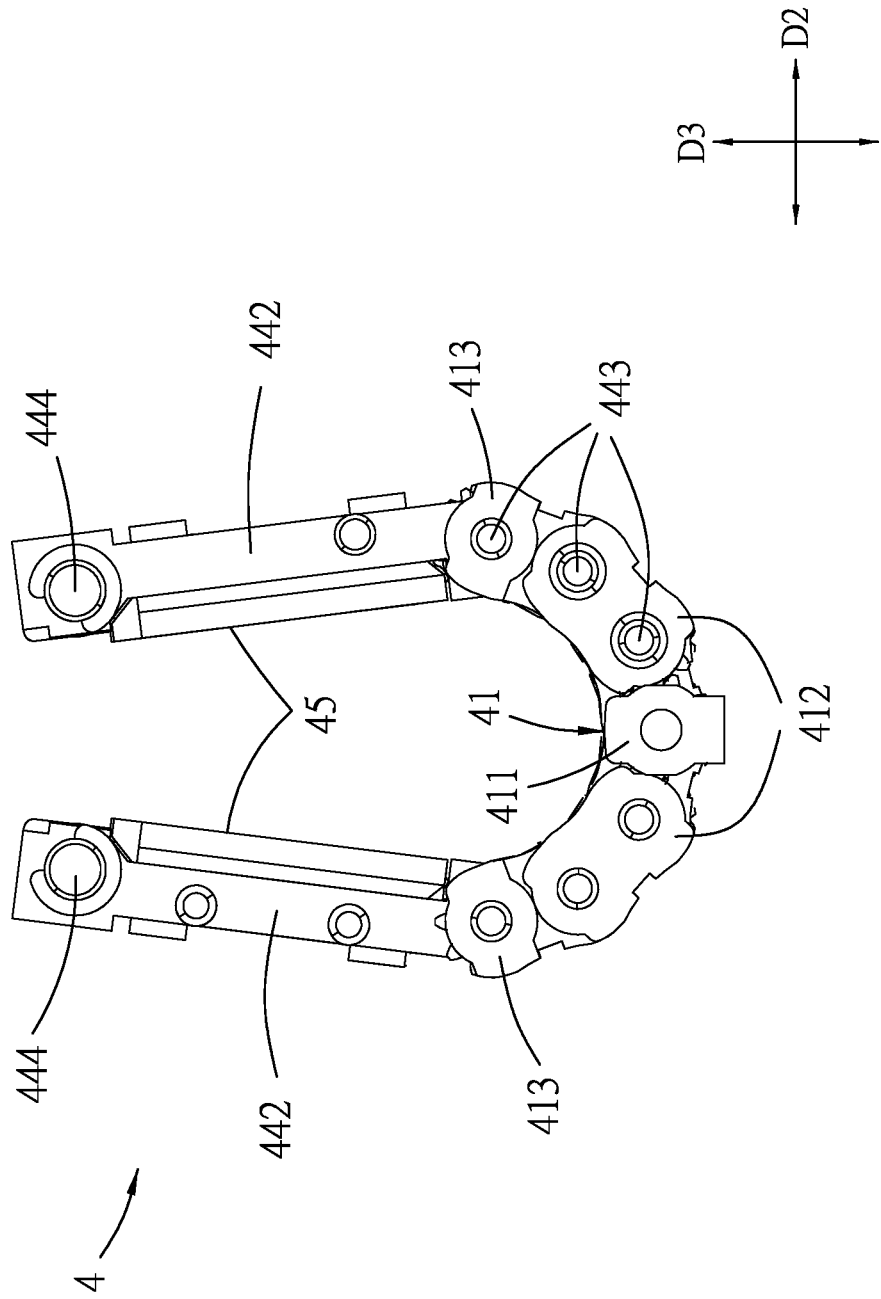
FIG. 14 is a front view of the torsion module in FIG. 13.
Figure 15:
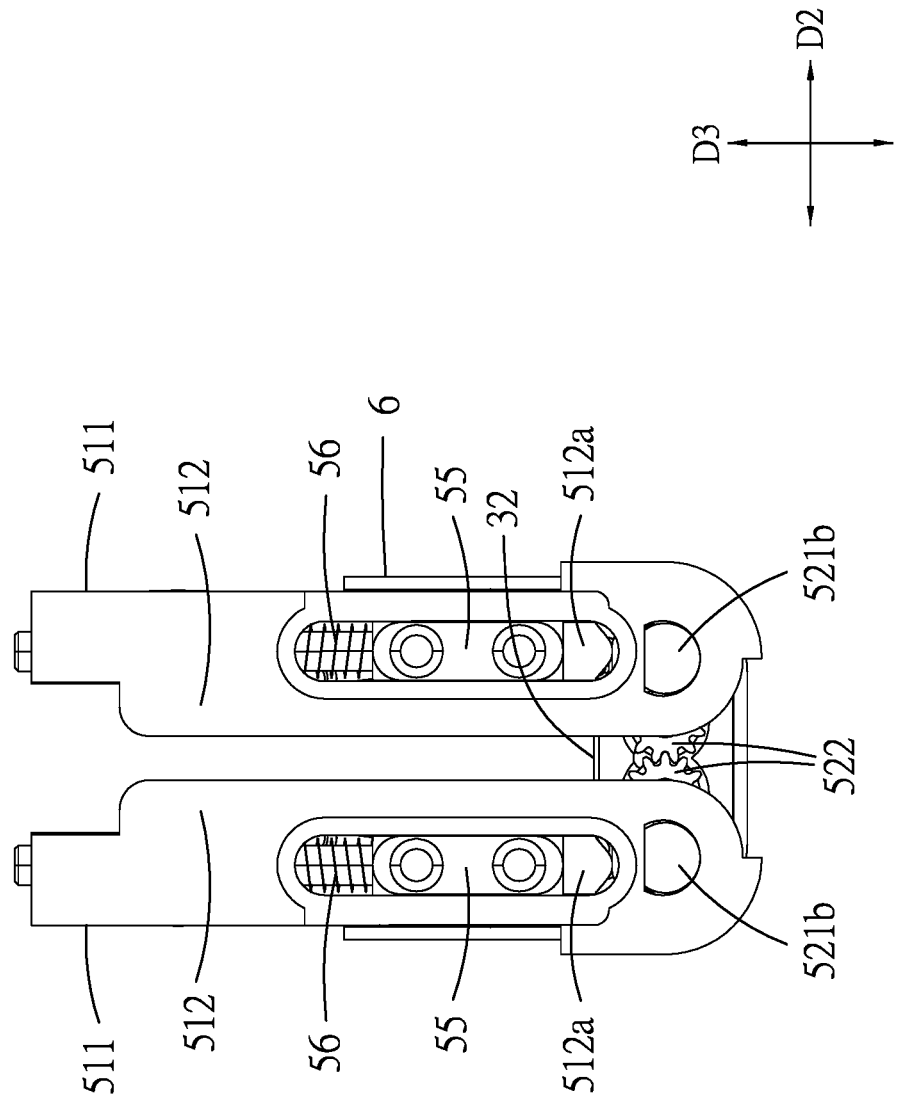
FIG. 15 is a front view of the torsion module and a bracket module of the hinge, illustrating that the hinge is in the infolding position.
Figure 16:
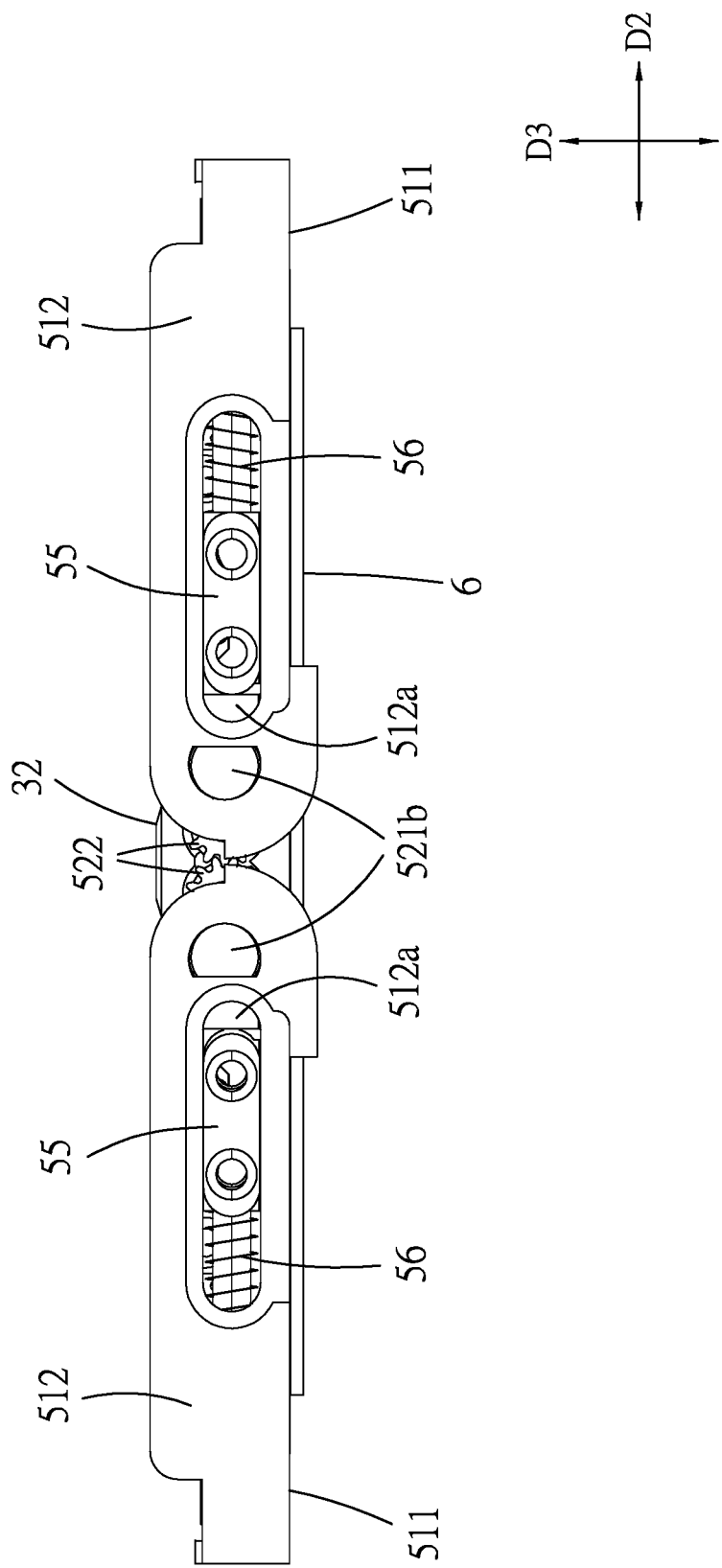
FIG. 16 is a front view similar to FIG. 15, but illustrating that the hinge is in the unfolded position.
Figure 17:
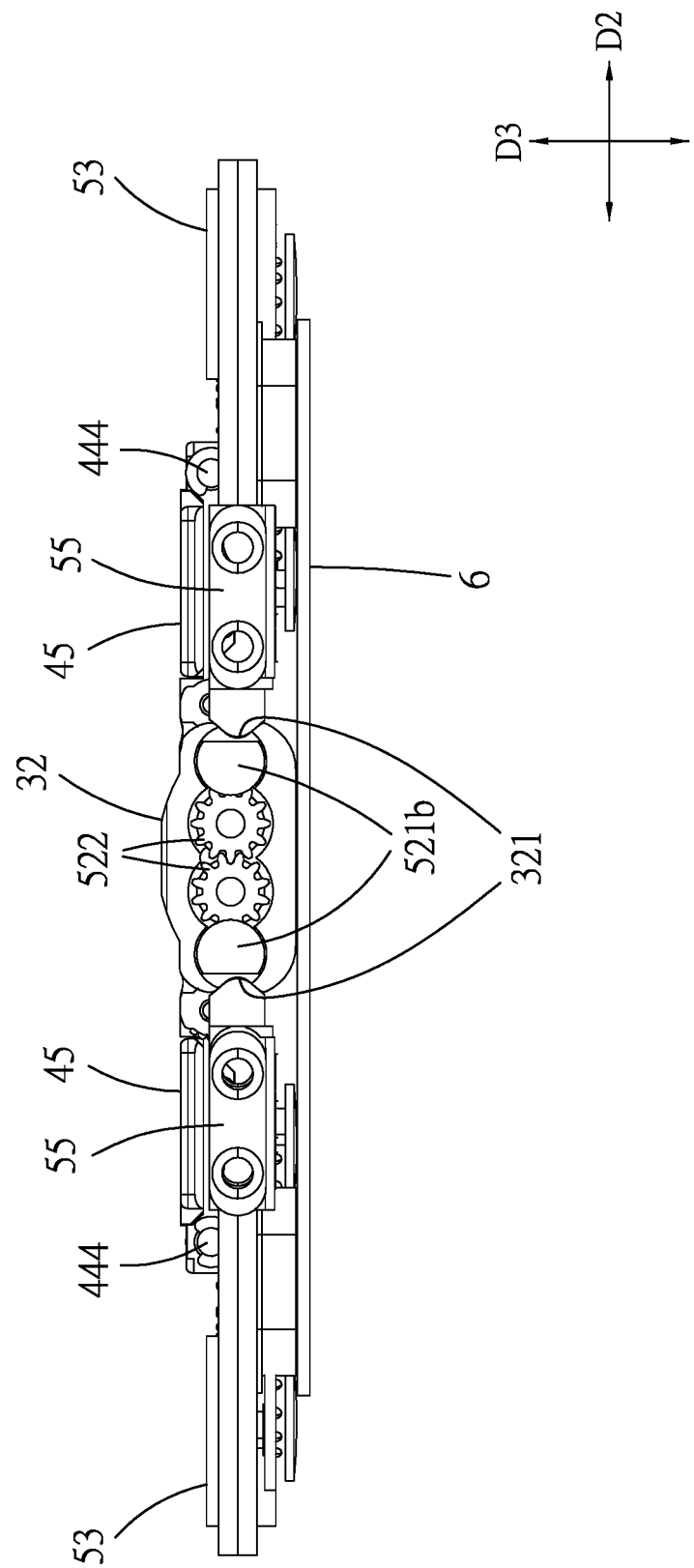
FIG. 17 is a front view of the torsion module and the bracket module of the hinge in the unfolded state, in which two brackets of the bracket module are removed therefrom.
Figure 18:
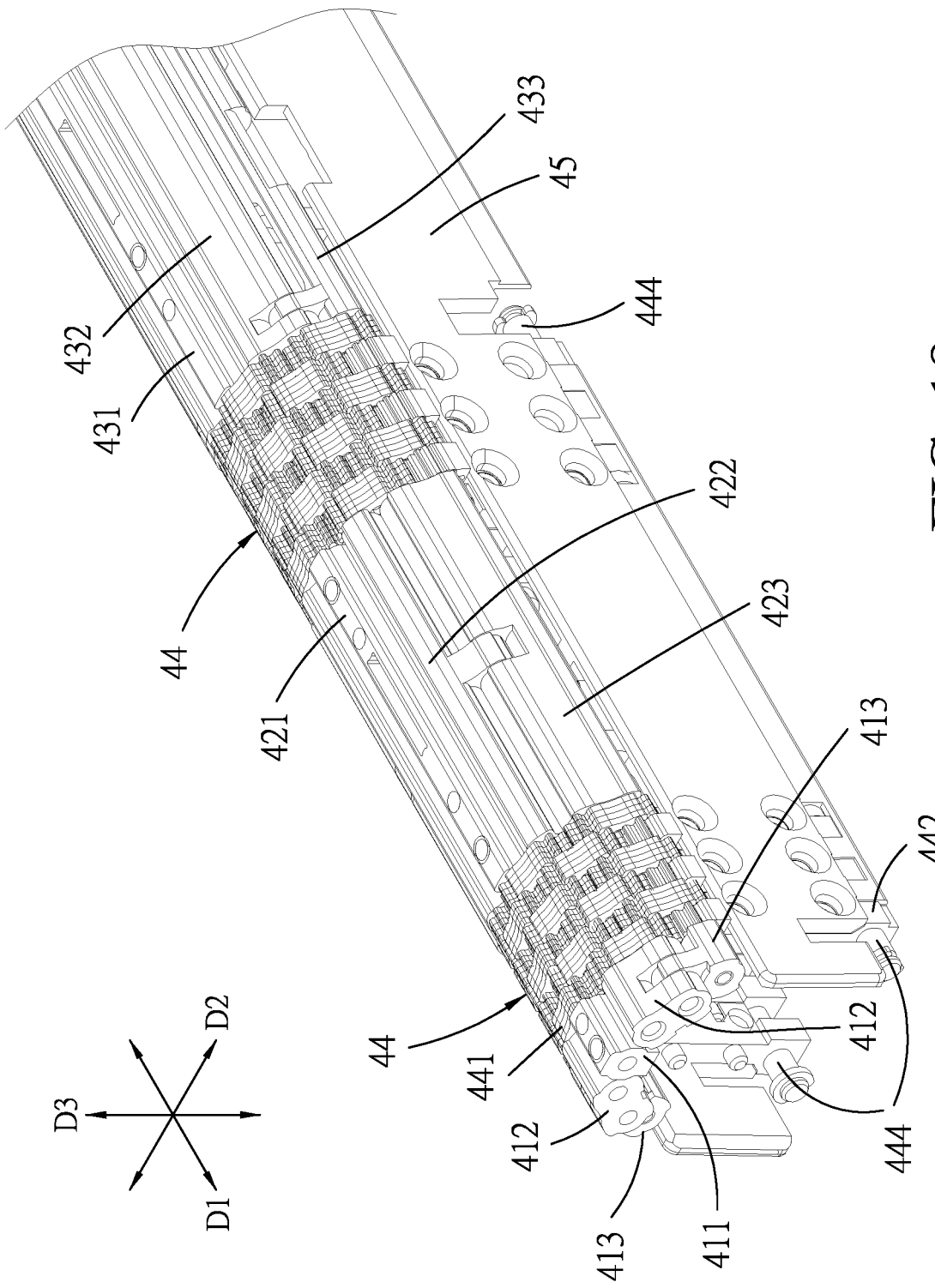
FIG. 18 is a fragmentary perspective view similar to FIG. 13, but illustrating that the hinge is in an outfolding position.
Figure 19:
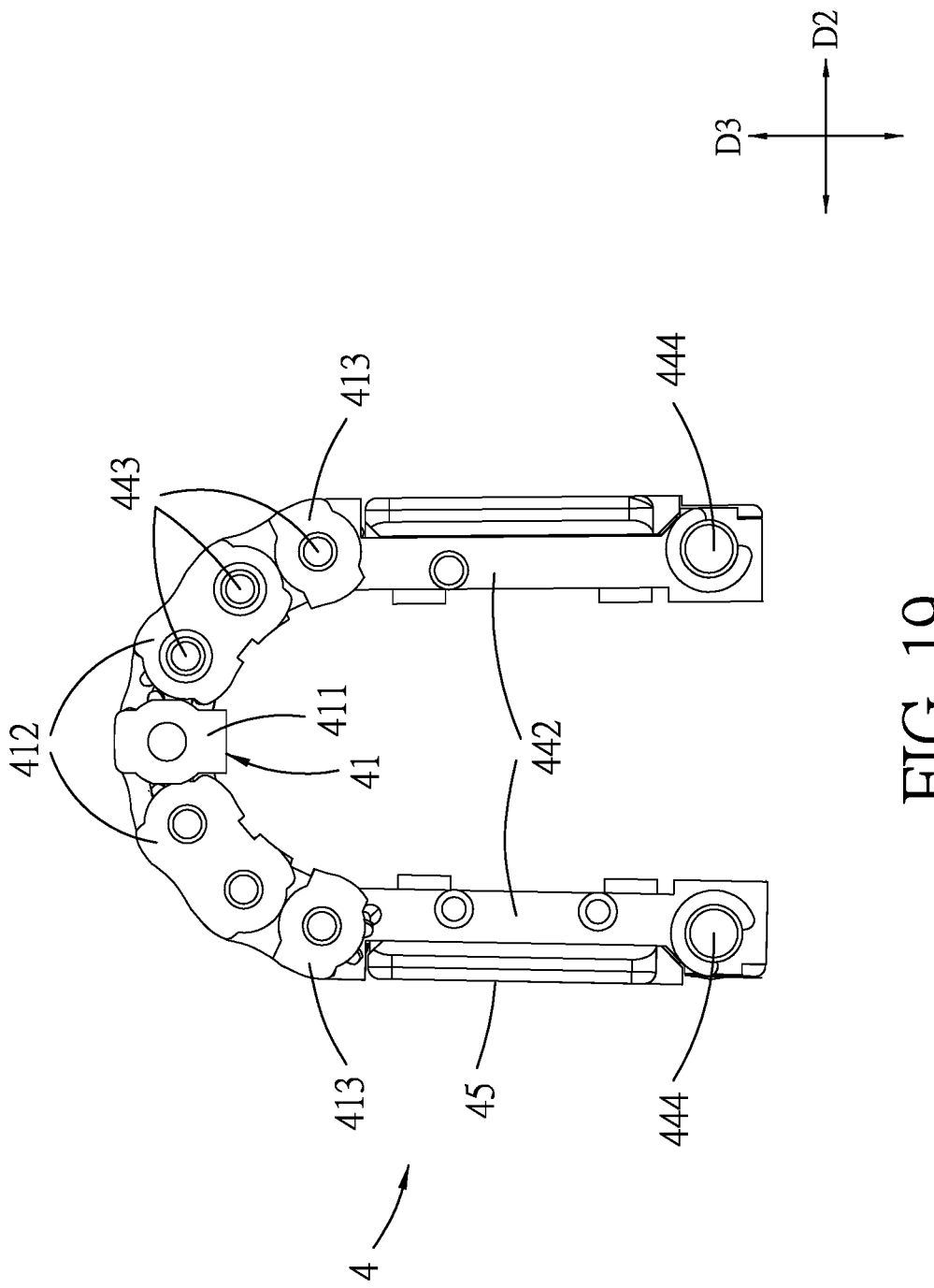
FIG. 19 is a front view similar to FIG. 14, but illustrating that the hinge is in the outfolding position.
Figure 20:
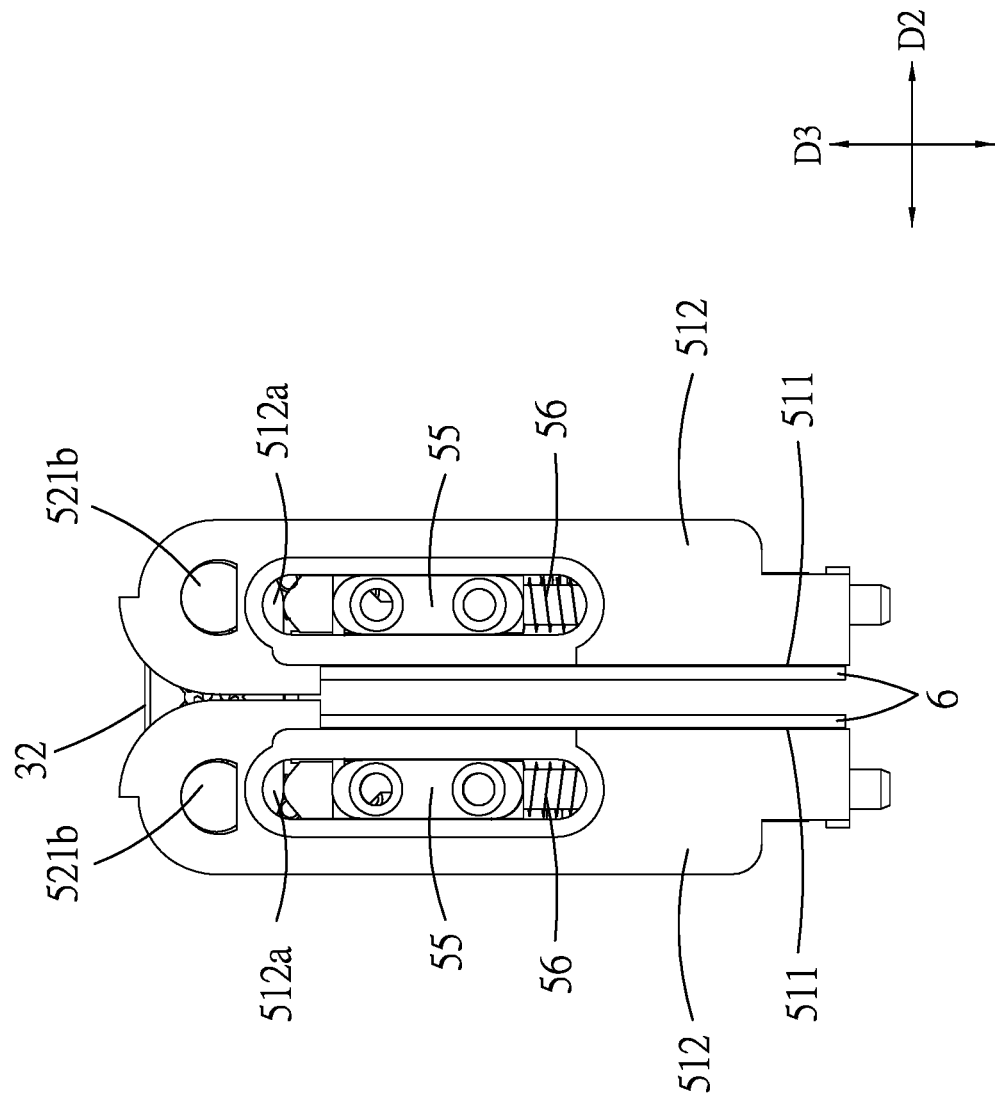
FIG. 20 is a front view similar to FIG. 15, but illustrating that the hinge is in the outfolding position.

Specifically, with reference to FIGS. 13 to 15, in the infolding position, the arm plates 45 cooperate with the supporting tubes of the outer supporting units 41, the middle supporting units 42 and the inner supporting unit 43 to define a drop-shaped receiving space for accommodating the display unit 2 and preventing excess bending and compression of the display unit 2. Next, with reference to FIGS. 1, 8A, 8B, 10, 16 and 17, during the rotation from the infolding position to the unfolded position, the housing shells 11 and the brackets 51 are rotated downwardly to result in movement of the positioning members 55 along the guiding slots (512a) and in turn the positioning members 55 are engaged in the corresponding recesses 321 by means of the biasing action of the positioning biasing members 56 so as to position the housing shells 11 in the unfolded state. A positioning click feel is provided to the user in the unfolded state, and the unfolded state of the housing shells 11 is ensured for facilitating use. At this stage, the thrust members 53 are biased by the thrust biasing members 54 to push the corresponding moved protrusions 24 and the sliding plates 22 away from the brackets 51 so as to provide an outward pulling force to the flexible display 21 to rapidly flatten the flexible display 21.

With reference to FIG. 2 and FIGS. 18 to 20, during the rotation from the unfolded position to the outfolding position, the first outer supporting tubes 412 of the outer supporting units 41 are rotated downwardly relative to the central outer supporting tubes 411, and the second outer supporting tubes 413 are rotated downwardly relative to the first outer supporting tubes 412. Likewise, the first middle (inner) supporting tubes 422 of the middle (inner) supporting units 42 are rotated downwardly relative to the central middle (inner) supporting tubes 421, and the second middle (inner) supporting tubes 423 are rotated downwardly relative to the first middle (inner) supporting tubes 422. With the torsion plate units 44 having the torsion plates 441 adjoined and stacked upon one another, a frictional torque is generated during the rotation to firmly and steadily maintain the outfolding position of the housing shells 11. At this stage, the supporting tubes of the outer supporting units 41, the middle supporting units 42 and the inner supporting unit 43 cooperatively define a semicircular-shaped supporting surface for supporting the display unit 2. The flexible display 21 is intimately attached to the supporting surface and is prevented from compression and deleterious deformation. Similarly, with reference to FIG. 2 and FIGS. 13 to 15, when the hinge 10 is shifted from the unfolded position to the infolding position, the first outer supporting tubes 412 of the outer supporting units 41 are rotated upwardly relative to the central outer supporting tubes 411, and the second outer supporting tubes 413 are rotated upwardly relative to the first outer supporting tubes 412. Likewise, the first middle (inner) supporting tubes 422 of the middle (inner) supporting units 42 are rotated upwardly relative to the central middle (inner) supporting tubes 421, and the second middle (inner) supporting tubes 423 are rotated upwardly relative to the first middle (inner) supporting tubes 422. With the torsion plate units 44 having the torsion plates 441 adjoined and stacked upon one another, a frictional torque is generated during the rotation to firmly and steadily maintain the infolding position of the housing shells 11. At this stage, the display unit 2 is accommodated in the drop-shaped receiving space as described previously and is prevented from excess bending.

As illustrated, with the sliding plates 22 of the display unit 2 which are slidably engaged with the rail grooves 141 of the display rails 14, when the hinge 10 is rotated between the unfolded position where the housing shells 11 are in the unfolded state, and the outfolding position, where the base shell walls 111 of the housing shells 11 are close to and face each other, the display unit 2 is movable relative to the housing shells 11, which prevents the flexible display 21 from a pulling or compressing force due to a difference between the inner and outer depths of the folded housing shells 11 that might damage the display unit 2.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A foldable display device comprising:
    a hinge;
    a housing shell unit including two housing shells which are respectively connected with left and right sides of said hinge in a left-right direction, two support plates which are respectively disposed on said housing shells, and a plurality of pairs of display rails which are defined between said housing shells and said support plates in an up-down direction that is transverse to the left-right direction, each of said housing shells having a base shell wall which is connected with said hinge, a surrounding wall which extends upwardly from a periphery of said base shell wall, and an upper flange wall which extends inwardly from an upper end of said surrounding wall, each of said support plates being spaced apart from both said base shell wall and said upper flange wall in the up-down direction, each of said support plates with said surrounding wall and said upper flange wall defining a moving space, each of said display rails being disposed in said moving space and having a rail groove; and
    a display unit including a flexible display which has a center portion extending in a front-rear direction that is transverse to both the left-right direction and the up-down direction and securely connected to said hinge, and two sliding plates which are movably engaged with said rail grooves, said flexible display having an attachment surface which faces said hinge, said sliding plates being securely attached to said attachment surface and being spaced apart from each other by said center portion,
    wherein said hinge is rotatable between an unfolded position, where said housing shells are in an unfolded state, and an outfolding position, where said base shell walls of said housing shells are close to and face each other, and
    wherein, during rotation of said hinge between the unfolded position and the outfolding position, said display unit is moved along said rail grooves,
    each of said support plates having a plurality of display sliding slots, each of which extends in the left-right direction, said housing shell unit further including a plurality of display sliding pieces which are respectively and slidably received in said display sliding slots and each of which is securely connected with a corresponding one of said sliding plates,
    each of said display rails being disposed between a respective one of said support plates and a portion of said upper flange wall extending in the left-right direction and at one of front and rear sides of said display unit.

2. The foldable display device as claimed in claim 1, wherein said hinge includes a base seat elongated in the front-rear direction, a bracket module disposed below said base seat, and a torsion module disposed above said base seat and securely connected to said center portion of said flexible display, said bracket module including two brackets which extend in the front-rear direction and which are respectively and securely connected to said support plates, each of said brackets being rotatable relative to said base seat.

3. The foldable display device as claimed in claim 2, wherein said torsion module includes two outer supporting units respectively disposed on front and rear ends of said base seat and extending in the front-rear direction, an inner supporting unit disposed on said base seat and extending in the front-rear direction, and at least one pair of torsion plate units disposed between said inner supporting unit and one of said outer supporting units, each of said outer supporting units having a central outer supporting tube which is securely connected to said base seat, two first outer supporting tubes which are disposed outboard of said central outer supporting tube, and two second outer supporting tubes which are disposed outboard of and respectively and pivotally connected with said first outer supporting tubes, said inner supporting unit having a central inner supporting tube which is securely connected to said base seat, two first inner supporting tubes which are disposed outboard of said central inner supporting tube, and two second inner supporting tubes which are disposed outboard of and respectively and pivotally connected with said first inner supporting tubes, each of said torsion plate units having a plurality of torsion plate assemblies which are alternately arranged in the front-rear direction, and a plurality of connecting shafts, each of which extends through said torsion plate assemblies, and one of said inner supporting unit and a corresponding one of said outer supporting units, each of said torsion plate assemblies having three sets of torsion plates which are arranged in the left-right direction, and a lateral connecting piece which is connected with said torsion plates of one set, said torsion plates of each set being aligned with each other in the front-rear direction and two of said connecting shafts extending through said torsion plates of each set, each of said torsion plates having toothed portions at two sides thereof which mesh with those of an adjacent one of said torsion plates so as to permit relative rotation of said torsion plates, said lateral connecting piece having a gear portion which meshes with one of said torsion plates.

4. The foldable display device as claimed in claim 3, wherein each of said brackets has a bracket plate elongated in the front-rear direction, and two end plates respectively and transversely disposed from front and rear ends of said bracket plate and extending in the left-right direction, said bracket module further including two synchronizing units which are respectively disposed on said front and rear ends of said base seat and which are respectively connected with said end plates of said brackets to make a synchronous rotation of said brackets relative to said base seat.

5. The foldable display device as claimed in claim 4, wherein said base seat includes an elongated strip and two receiving blocks respectively connected with front and rear ends of said elongated strip, each of said synchronizing units having two rotating members which are rotatably disposed in a respective one of said receiving blocks and which are respectively connected with said end plates of said brackets, and two synchronous gears which are rotatably disposed in the respective one of said receiving blocks and mesh with each other and which are interposed between said rotating members, each of said rotating members having a rotating gear portion which meshes with an adjacent one of said synchronous gears, a transmitting shaft portion which is securely connected with a corresponding one of said end plates, and a pivot shaft portion which is extended in a corresponding one of said receiving blocks such that, a torque generated as a result of a rotation of one of said brackets relative to said base seat is transmitted through said rotating members and said synchronous gears to the other one of said brackets so as to make the synchronous rotation of said brackets.

6. The foldable display device as claimed in claim 5, wherein each of said receiving blocks has two recesses respectively formed at left and right ends thereof, each of said end plates being in form of an L-shaped plate which is formed with a guiding slot that extends in the left-right direction, said bracket module further including four positioning members, each of which is slidably engaged in said guiding slot and abuts against a corresponding one of said receiving blocks, and four positioning biasing members, each of which is disposed between a respective one of said positioning members and a corresponding one of said end plates to bias said positioning member to said corresponding receiving block such that said positioning member is engaged in a corresponding one of said recesses when said hinge is in the unfolded position so as to position said housing shells in the unfolded state.

7. The foldable display device as claimed in claim 5, wherein said torsion module further includes two arm plates, each of which is securely connected with corresponding ones of said lateral connecting pieces and extends in the front-rear direction, each of said brackets further having at least one pair of connecting blocks which are disposed on said bracket plate and each of which has an extending slot, each of said torsion plate units further having two coupling shafts, each of which is securely connected with corresponding ones of said lateral connecting pieces and extends through said extending slot of a respective one of said connecting blocks such that rotation of said brackets is transmitted to rotate said arm plates, said lateral connecting pieces and said torsion plates.

8. The foldable display device as claimed in claim 5, wherein said display unit further includes at least one pair of moved protrusions which are respectively and securely disposed on said sliding plates, each of said support plates of said housing shell unit having at least one moving slot which is formed therein and extends in the left-right direction, said bracket plate of each of said brackets having at least one abutment wall which is formed thereon, said bracket module further including at least one pair of thrust members which are respectively and movably disposed in said moving slots and respectively abut against said moved protrusions, and at least one pair of thrust biasing members, each of which is disposed between said abutment wall and a corresponding one of said thrust members to bias said corresponding thrust member to a corresponding one of said moved protrusions such that said sliding plates are moved away from said brackets when said hinge is rotated to the unfolded position.

9. The foldable display device as claimed in claim 1, wherein said hinge is rotatable among the unfolded position, the outfolding position, and an infolding position, where said support plates are close to and face each other, and wherein, during rotation of said hinge among the unfolded position, the outfolding position and the infolding position, said display unit is moved along said rail grooves.

* * * * *